US012720039B2

(12) United States Patent
Ha et al.

(10) Patent No.: US 12,720,039 B2
(45) Date of Patent: Aug. 25, 2026

(54) DISPLAY DEVICE AND METHOD FOR CONTROLLING THE SAME

(71) Applicant: SAMSUNG DISPLAY CO., LTD., Yongin-si (KR)

(72) Inventors: Young Sang Ha, Yongin-si (KR); Beom Shik Kim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 199 days.

(21) Appl. No.: 18/173,032

(22) Filed: Feb. 22, 2023

(65) Prior Publication Data

US 2023/0336705 A1 Oct. 19, 2023

(30) Foreign Application Priority Data

Apr. 13, 2022 (KR) ........................ 10-2022-0045905

(51) Int. Cl.

| | |
|---|---|
| ***G02B 30/27*** | (2020.01) |
| ***H04N 13/305*** | (2018.01) |
| ***H04N 13/359*** | (2018.01) |

(52) U.S. Cl.

CPC ........... *H04N 13/359* (2018.05); *G02B 30/27* (2020.01); *H04N 13/305* (2018.05)

(58) Field of Classification Search

CPC .... G02B 30/27; H04N 13/305; H04N 13/317; H04N 13/356

See application file for complete search history.

(56) References Cited

U.S. PATENT DOCUMENTS

| | | | | |
|---|---|---|---|---|
| 7,259,915 | B2 | 8/2007 | Kwon et al. | |
| 8,617,335 | B2 * | 12/2013 | Kanematsu | B32B 3/12 264/284 |
| 9,069,177 | B2 | 6/2015 | Chung et al. | |
| 10,324,686 | B2 | 6/2019 | Jiao et al. | |
| 11,017,704 | B1 | 5/2021 | Ha | |
| 2005/0264863 | A1 * | 12/2005 | Kwon | G02B 3/0031 359/248 |
| 2013/0335403 | A1 * | 12/2013 | Chung | H04N 13/317 345/419 |
| 2014/0153091 | A1 * | 6/2014 | Boudreau | G02B 30/27 156/99 |
| 2014/0299175 | A1 * | 10/2014 | Gilbert | F24S 80/50 136/246 |

(Continued)

FOREIGN PATENT DOCUMENTS

| | | |
|---|---|---|
| JP | 2014-002372 | 1/2014 |
| JP | 2015-502511 | 1/2015 |

(Continued)

*Primary Examiner* — Yuzhen Shen

(74) *Attorney, Agent, or Firm* — F. CHAU & ASSOCIATES, LLC

(57) ABSTRACT

A display device includes a display panel that includes pixels that emit light to a front surface of the display panel, a lens array that extends in a first direction and includes lens elements arranged in a second direction perpendicular to the first direction, and a roller that moves the lens array in the second direction. Each of the lens elements includes a support body that extends in the first direction, and a lens body that includes a lower portion in contact with the support body and a convex upper portion, and support bodies of the lens elements are separated from each other.

14 Claims, 9 Drawing Sheets

(56) References Cited

U.S. PATENT DOCUMENTS

| | | | | |
|---|---|---|---|---|
| 2017/0243803 | A1* | 8/2017 | Lin | H01L 21/4807 |
| 2022/0357591 | A1* | 11/2022 | Makinen | H04N 13/305 |

FOREIGN PATENT DOCUMENTS

| | | |
|---|---|---|
| KR | 10-0589225 | 6/2006 |
| KR | 10-1925459 | 11/2018 |
| KR | 10-2130138 | 6/2020 |
| KR | 10-2020-0077656 | 7/2020 |
| KR | 10-2187186 | 12/2020 |
| KR | 10-2021-0054653 | 5/2021 |

* cited by examiner

FIG. 9

DLj
DATA(i-1)j
DATAij
SL(i-1) = SLi3
SLi = SLi1, SLi2, SLi4
ELi
EP
NEP
EP

DISPLAY DEVICE AND METHOD FOR CONTROLLING THE SAME

CROSS-REFERENCE TO RELATED APPLICATION

The application claims priority under 35 U.S.C. § 119 from Korean Patent Application No. 10-2022-0045905, filed Apr. 13, 2022 in the Korean Intellectual Property Office, the contents of which are herein incorporated by reference in their entirety.

TECHNICAL FIELD

Embodiments of the present disclosure are directed to a display device and a method for controlling the same.

DISCUSSION OF THE RELATED ART

A stereoscopic image display device provides physical factors so that a viewer can three-dimensionally perceive an image by stimulating the viewer's visual sense like a real object. For example, a stereoscopic image display device provides different images to a viewer's left and right eyes so that the viewer can view a stereoscopic image due to binocular parallax between the left and right eyes.

Recently, studies on a glasses-free method in which stereoscopic glasses are not worn have been actively conducted. A glasses-free method may use a lenticular method that separates left and right eye images using a cylindrical lens array, a barrier method that separates left and right eye images using a barrier, etc.

SUMMARY

Embodiments of the disclosure provide a display device that can switch between a 3-dimensional (3D) display mode and a 2-dimensional (2D) display mode, and a method for controlling the same.

A display device according to an embodiment of the present disclosure include: a display panel that includes pixels that emit light to a front surface of the display panel; a lens array that extends in a first direction and includes lens elements arranged in a second direction perpendicular to the first direction; and a roller that moves the lens array in the second direction. Each of the lens elements includes: a support body that extends in the first direction; and a lens body that includes a lower portion in contact with the support body and a convex upper portion, and support bodies of the lens elements are separated from each other.

The lens elements may be made of a rigid material, and the lens array may further include a connecting body that flexibly connects the lens elements.

The support body and the lens body may be made of a transparent metal, and the connecting body may be made of resin.

The support body and the lens body may be made of aluminum oxynitride ($(AlN)_x \cdot (Al_2O_3)_{1-x}$).

Lens bodies of the lens elements that cover the pixels may be in contact with each other, and lens bodies of the lens elements that cover the roller may be spaced apart from each other.

The support bodies of the lens elements that cover the pixels may be in surface contact with each other in the second direction, and the support bodies of the lens elements that cover the roller might not be in surface contact with each other.

A portion of the connecting body that connects the support bodies of the lens elements that cover the roller may be longer than a portion of the connecting body that connects the support bodies of the lens elements that cover the pixels.

The display device may further include a cabinet that accommodates the roller and the lens array.

In a 3-dimensional (3D) display mode, the lens array may cover the pixels on the front surface of the display panel, and in a 2-dimensional (2D) display mode, the lens array may be wound around the roller inside the cabinet and might not cover the pixels on the front surface of the display panel.

In a 3-dimensional (3D) display mode, the lens array may cover the pixels on the front surface of the display panel, and in a 2D display mode, the lens array may be positioned on a rear surface of the display panel and might not cover the pixels on the front surface of the display panel.

According to an embodiment of the present invention, a method for controlling a display device that includes a lens array that extends in a first direction and includes lens elements arranged in a second direction perpendicular to the first direction, and a roller, includes: moving the lens array in the second direction by the roller so that the lens array covers pixels on a front surface of a display panel in a 3D display mode; and moving the lens array opposite to the second direction by the roller so that the lens array does not cover the pixels on the front surface of the display panel in a 2D display mode. Each of the lens elements include: a support body that extends in the first direction; and a lens body that includes a lower portion in contact with the support body and a convex upper portion, and support bodies of the lens elements are separated from each other. The pixels emit light to the front surface of the display panel.

The lens elements may be made of a rigid material, and the lens array may further include a connecting body that flexibly connects the lens elements.

The support body and the lens body may be made of a transparent metal, and the connecting body may be made of resin.

The support body and the lens body may be made of aluminum oxynitride ($(AlN)_x \cdot (Al_2O_3)_{1-x}$).

Lens bodies of the lens elements that cover the pixels may be in contact with each other, and lens bodies of the lens elements that cover the roller may be spaced apart from each other.

The support bodies of the lens elements that cover the pixels may be in surface contact with each other in the second direction, and the support bodies of the lens elements that cover the roller might not be in surface contact with each other.

A portion of the connecting body that connects the support bodies of the lens elements that cover the roller may be longer than a portion of the connecting body that connects the support bodies of the lens elements that cover the pixels.

The display device may further include a cabinet that accommodates the roller and the lens array.

The lens array may be positioned inside the cabinet in the 2D display mode.

The lens array may be positioned on a rear surface of the display panel in the 2D display mode.

BRIEF DESCRIPTION OF THE DRAWINGS

FIGS. 7 to 9 illustrate electrical configurations of a display device according to an embodiment.

DETAILED DESCRIPTION

Figure 1:
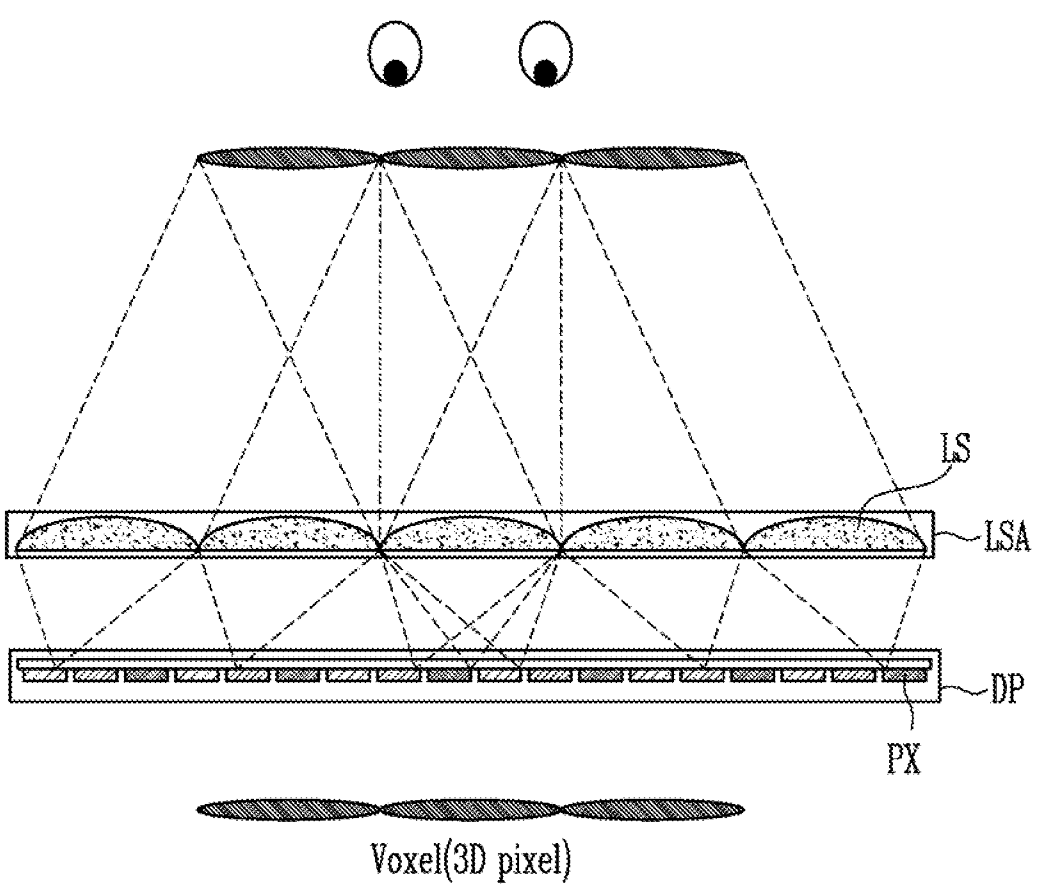
FIG. 1 illustrates a stereoscopic image display device of a lens array method.

Hereinafter, various embodiments of the present disclosure will be described in detail with reference to the accompanying drawings so that those of ordinary skill in the art may easily implement the present disclosure. The present disclosure may be embodied in various different forms and is not limited to the embodiments described herein.

In the figures, and the same or similar components may be denoted by the same reference numerals throughout the specification.

FIG. 1 illustrates a stereoscopic image display device of a lens array method.

Referring to FIG. 1, in an embodiment, a stereoscopic image display device includes a display panel DP and a lens array LSA.

The display panel DP includes pixels PX that emit light to display an image. In an embodiment, each of the pixels PX emits one of red light, green light, or blue light. However, this is an example, and the color of light emitted from the pixel PX is not necessarily limited thereto. To realize a full-color image, light of various colors is emitted from the pixel PX.

The lens array LSA is disposed on the display panel DP and includes lenses LS that refract light emitted from the pixels PX. For example, the lens array LSA may be implemented as a lenticular lens array, a micro lens array, etc.

A light field display is a 3-dimensional (3D) display device that implements a stereoscopic image by forming a light field expressed as a vector distribution (intensity, direction) of light in space using a flat panel display and an optical element, such as the lens array LSA. The light field display realizes a more natural stereoscopic image because a viewer can see the depth and side of an object, and is a display technology that is expected to be used in various ways by AR (augmented reality) technology, etc.

A light field can be implemented in various ways. For example, a light field can be formed by a method of forming multi-directional light fields using multiple projectors, a method of controlling a direction of light using a diffraction grating, a method of controlling the direction and intensity (brightness) of light according to a combination of each pixel using two or more panels, a method of controlling a direction of light using a pinhole or barrier, a method of controlling a direction of refraction of light through a lens array, etc.

In an embodiment, as shown in FIG. 1, a lens array type stereoscopic image display device displays a stereoscopic image (3D image) by forming a light field.

A plurality of pixels PX are allocated to each lens LS. Light emitted from each pixel PX is refracted by the lens LS and propagates in a specific direction to form a light field expressed in intensity and direction of light. When a viewer looks at the stereoscopic image display device in a light field formed in this way, the viewer can feel a stereoscopic effect of a corresponding image.

Image information according to a viewer's viewpoint in the light field is defined and processed in units of voxels. A voxel is graphic information that defines a predetermined point (or pixel) in a 3D space.

In addition, the resolution of a 2-dimensional (2D) image is determined by the number, such as a density of pixels in the same area. For example, when the number of pixels in the same area increases, the resolution increases. That is, to display a high-resolution image, a display panel DP that has a high pixel density is used.

Similarly, when the number of voxels at the same viewpoint through the lens array LSA increases, the resolution of the stereoscopic image increases.

Figure 2:
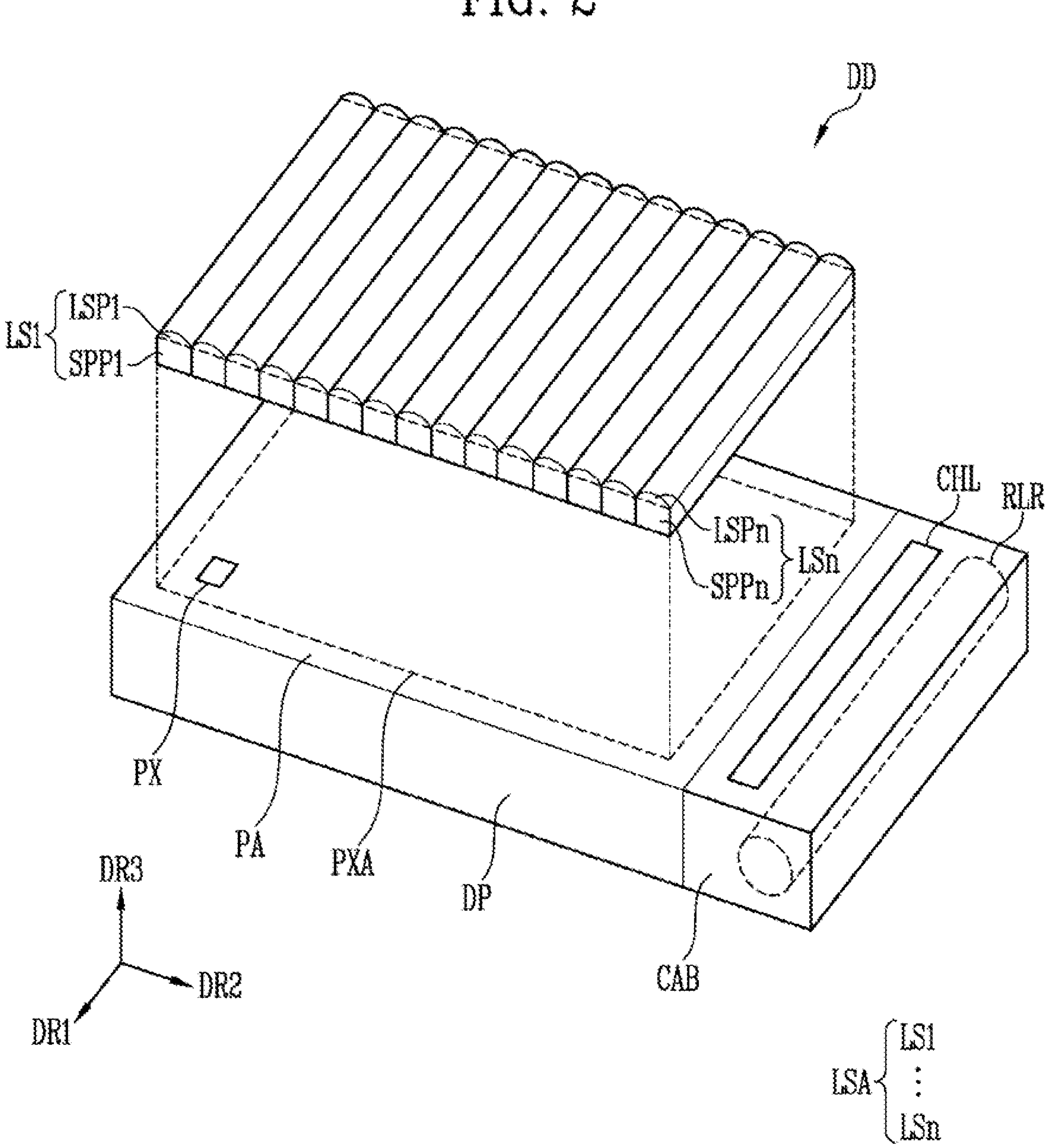
FIG. 2 illustrates a display device according to an embodiment of the present invention.

FIG. 2 illustrates a display device according to an embodiment of the present disclosure.

Referring to FIG. 2, in an embodiment, a display device DD includes a display panel DP, a lens array LSA, and a roller RLR. According to an embodiment, the display device DD further includes a cabinet CAB.

The display panel DP includes pixels that emit light to a front surface. In FIG. 2, the front surface of the display panel DP is positioned in a third direction DR3. A first direction DR1, a second direction DR2, and the third direction DR3 are mutually perpendicular to each other. The front surface of the display panel DP is parallel to a plane defined by the first direction DR1 and the second direction DR2.

The display panel DP includes pixels PX and drivers (or driving circuits) that drive the pixels PX. All or at least a portion of the display panel DP are flexible.

In an embodiment, each pixel PX includes a self-light emitting element. For example, the self-light emitting element may be one of an organic light emitting element, an inorganic light emitting element, or a light emitting element composed of an inorganic material and an organic material in combination.

However, these are examples, and embodiments are not necessarily limited thereto. In some embodiments, the display panel DP is implemented as one of a liquid crystal display panel, a plasma display panel, a display panel that uses quantum dots, etc. When the display panel DP includes a liquid crystal display panel, the display panel DP also includes a backlight unit.

The display panel DP includes a pixel area PXA and a peripheral area PA on the front surface. For example, the pixel area PXA is defined on a plane parallel to the first direction DR1 and the second direction DR2.

The pixels PX are disposed in the pixel area PXA. For example, the pixel area PXA includes a light emitting element in each pixel PX and a pixel circuit connected to the light emitting element.

In an embodiment, the pixels PX disposed in the pixel area PXA are divided into active pixels and inactive pixels. The active pixels actually emit light to display an image.

The inactive pixels are manufactured together with the active pixels for convenience of processing, but do not actually display an image. For example, pixels disposed at an edge of the pixel area PXA are not connected to signal lines or do not emit light due to the shape, size, circuit design condition, image condition, etc., of the display panel. As described above, the pixels that are distributed at the edge of the pixel area PXA and do not emit light are the inactive pixels.

The peripheral area PA is located on at least one side of the pixel area PXA. Drivers (or driving circuits) that drive the pixels PX and wirings that connect the pixels PX and the drivers are disposed in the peripheral area PA. The drivers include a data driver, a scan driver, a timing controller, etc.

For example, at least a portion of the drivers is disposed on a printed circuit board connected to the peripheral area PA according to design conditions. Alternatively, at least a portion of the drivers are integrated with the peripheral area PA or mounted on the peripheral area PA.

The lens array LSA extends in the first direction DR1, and includes lens elements LS1 to LSn arranged in the second direction DR2. Each of the lens elements LS1 to LSn includes a support body and a lens body. For example, the lens element LS1 includes a support body SPP1 and a lens body LSP1, and the lens element LSn includes a support body SSPn and a lens body LSPn.

The support body SPPn extends in the first direction DR1. For example, the support body SPPn has a hexahedral shape that extends in the first direction DR1. In an embodiment, the support body SPP1 has more surfaces than a hexahedron.

The lens body LSPn has a lower portion in contact with the support body SPPn and a convex upper portion. For example, the lens body LSPn has a semi-cylindrical shape that extends in the first direction DR1. However, this is an example, and embodiments are not necessarily limited thereto. In embodiment, lens bodies LSP1 to LSPn extend in a slanted arrangement that is obliquely inclined with respect to the first direction DR1. Each of the lens bodies LSP1 to LSPn is a lenticular lens. The size and arrangement of the lens bodies LSP1 to LSPn are determined by conditions such as a size of the pixel area PXA, a viewing distance, a pixel size, a resolution, a pixel arrangement structure, etc. However, this is an example, and embodiments are not necessarily limited thereto. In embodiment, the lens bodies LSP1 to LSPn are micro lenses. When viewed on a plane, the micro lenses have a shape such as a hexagon, a circle, an oval, etc.

The support body SPPn and the lens body LSPn correspond to each other and are integrally formed as one body. For example, the support body SPPn and the lens body LSPn are simultaneously formed of the same material.

The roller RLR moves the lens array LSA in the second direction DR2. For example, the roller RLR is mechanically connected to the lens array LSA, and the lens array LSA moves in a specific direction according to the rotation direction of the roller RLR. According to an embodiment, the roller RLR moves the lens array LSA in a direction opposite to the second direction DR2. For example, when the roller RLR rotates clockwise, the lens array LSA moves in the second direction DR2. When the roller RLR rotates counterclockwise, the lens array LSA moves in a direction opposite to the second direction DR2. The roller RLR extends in the first direction DR1. The roller RLR is positioned inside the cabinet CAB.

The cabinet CAB is positioned at one side of the display panel DP. For example, the cabinet CAB is positioned at one side of the display panel DP in the second direction DR2. Since the cabinet CAB is positioned on a side surface of the display panel DP instead of the front surface or rear surface, the display device DD can be prevented from being thick. The cabinet CAB includes an insertion hole CHL. The insertion hole CHL extends in the first direction DR1. The length of the insertion hole CHL is greater than the length of the lens elements LS1 to LSn. For example, when the roller RLR rotates clockwise, the lens array LSA enters into the cabinet CAB through the insertion hole CHL. The lens array LSA in the cabinet CAB is wound around the roller RLR and accommodated in the cabinet CAB.

Figure 3:
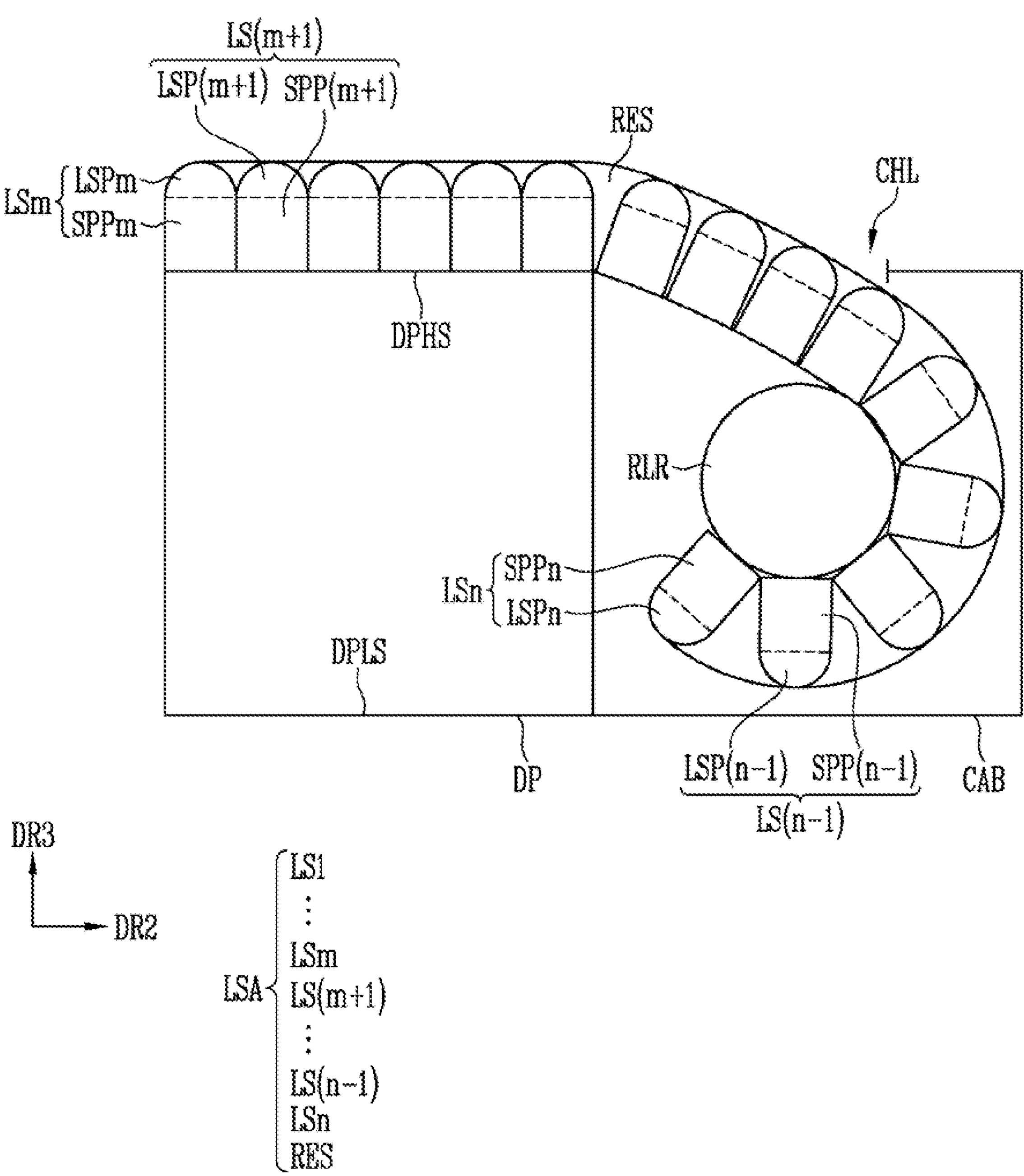
FIG. 3 is a a cross-section of a display device of FIG. 2.

FIG. 3 is a cross-section of the display device of FIG. 2.

FIG. 3 is an enlarged view of a portion of the display panel DP and the lens array LSA of FIG. 2. The lens array LSA of FIG. 2 is disposed on a front surface DPHS of the display panel DP. For example, the lens array LSA includes a plurality of lens elements LS1, . . . , LSm, LS(m+1), . . . , LS(n−1), and LSn, but FIG. 3 shows only an m-th lens element LSm to the last (n-th) lens element LSn. In an embodiment, the pixels PX emit light toward the front surface DPHS of the display panel DP and do not emit light toward a rear surface DPLS of the display panel DP.

The lens elements LSm to LSn are made of a rigid material. The lens array LSA includes a connecting body RES that flexibly and elastically connects the lens elements LSm to LSn to each other. The support body SPPn and the lens body LSPn are made of a transparent plastic, a transparent metal, or from other transparent materials. For example, the support body SPPn and the lens body LSPn are made of aluminum oxynitride $((AlN)_x \cdot (Al_2O_3)_1\text{-}x)$. The connecting body RES is made of resin.

In an embodiment, lens bodies LSPm and LSP(m+1) of the lens elements LSm and LS(m+1) that cover the pixels PX contact each other. On the other hand, lens bodies LSP(n−1) and LSPn of the lens elements LS(n−1) and LSn that cover the roller RLR are spaced apart from each other. That is, in a 3D display mode, a high-resolution 3D image is provided by densely arranging the lens bodies LSPm and LSP(m+1). In addition, in a 2D display mode, the lens bodies LSP(n−1) and LSPn are spaced apart from each other to efficiently use the storage space without exhibiting an optical function.

In an embodiment, support bodies SPPm and SPP(m+1) of the lens elements LSm and LS(m+1) that cover the pixels PX are in surface contact with each other in the second direction DR2. On the other hand, support bodies SPP(n−1) and SPPn of the lens elements LS(n−1) and LSn that cover the roller RLR are not in surface contact with each other. For example, the support bodies SPP(n−1) and SPPn that are not in surface contact are in line contact with each other. For example, in a 3D display mode, the lens bodies LSPm and LSP(m+1) are firmly fixed by the support bodies SPPm and SPP(m+1) being in surface contact and engaged with each other. In addition, in a 2D display mode, the support bodies SPPm and SPP(m+1) are not in surface contact with each other to efficiently use the storage space.

In an embodiment, a portion of the connecting body RES that connects the support bodies SPP(n−1) and SPPn of the lens elements LS(n−1) and LSn that cover the roller RLR is longer than a portion of the connecting body RES that connects the support bodies SPPm and SPP(m+1) of the lens elements LSm and LS(m+1) that cover the pixels PX. That is, since the lens elements LS(n−1) and LSn wound around the roller RLR are spaced apart from each other, the connecting body RES is in an elongated state.

In an embodiment, the support bodies SPP1 to SPPn of the lens elements LS1 to LSn are separated from each other. In the prior art, lens bodies are connected to each other on a base layer of one common body. However, as the thickness of the base layer of the one common body increases, the lens elements LS1 to LSn are stably supported, but flexibility is reduced. On the other hand, as the thickness of the base layer of the one common body decreases, flexibility increases, but since the lens elements LS1 to LSn cannot be stably supported, wrinkles can occur in the lens array LSA. According to an embodiment, the flexibility of the lens array LSA is maximized by separating the support bodies SPP1 to SPPn of the lens elements LS1 to LSn from each other. In addition, in a 3D display mode, the lens bodies LSP1 to LSPn are stably supported by the support bodies SPP1 to SPPn being in surface contact and engaged with each other.

Figure 4:
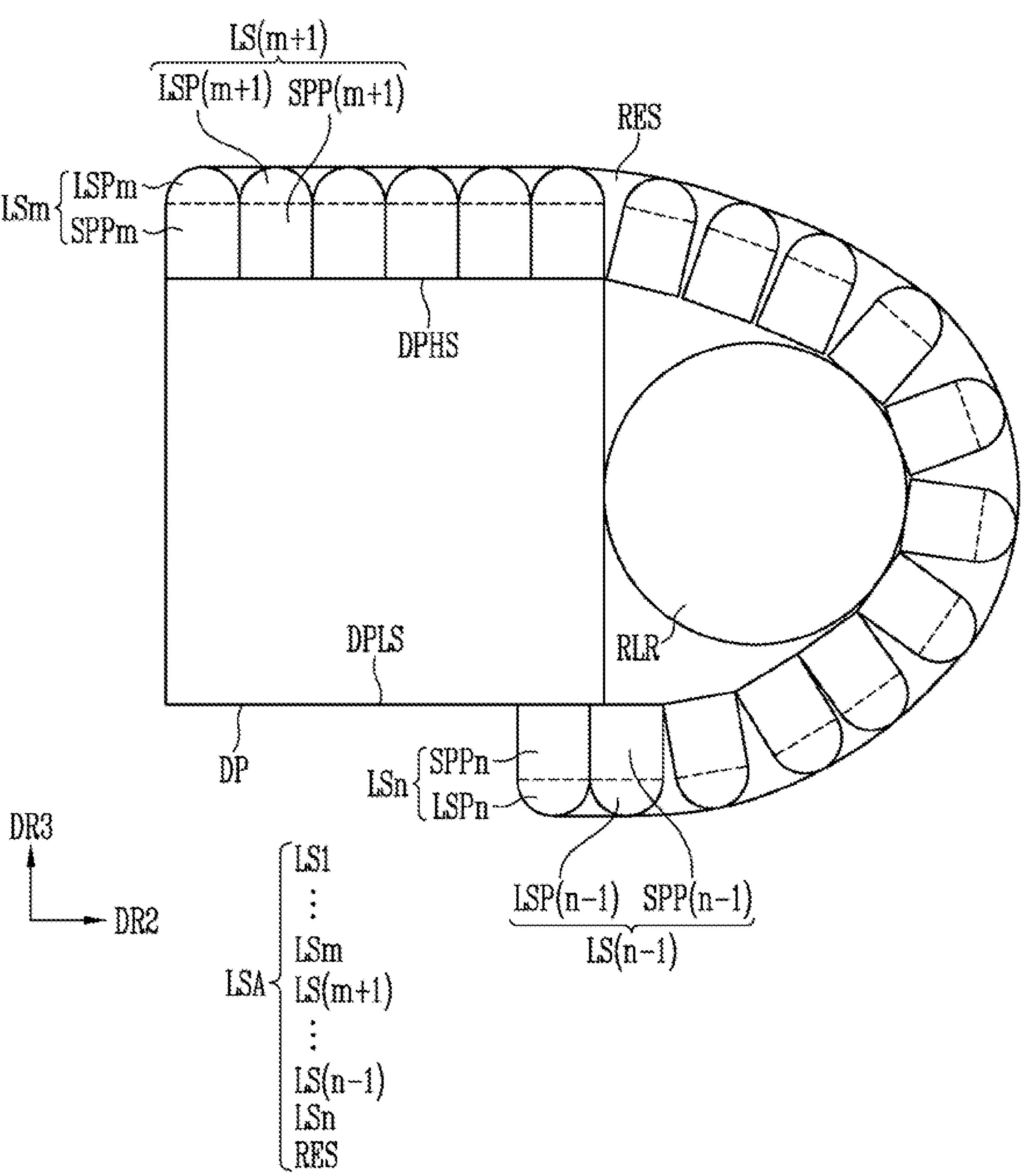
FIG. 4 illustrates a display device according to an embodiment of the present disclosure.

FIG. 4 illustrates a display device according to an embodiment of the present disclosure.

Referring to FIG. 4, an embodiment in which the display device DD does not include the cabinet CAB is shown. In a 2D display mode, the lens array LSA is moved to be positioned on the rear surface DPLS of the display panel DP. Compared to an embodiment of FIG. 3, an embodiment of FIG. 4 does not require a separate cabinet CAB for the display device DD. Since other configurations may overlap with those of the display device DD of FIG. 3, duplicate descriptions will be omitted.

Figure 5:
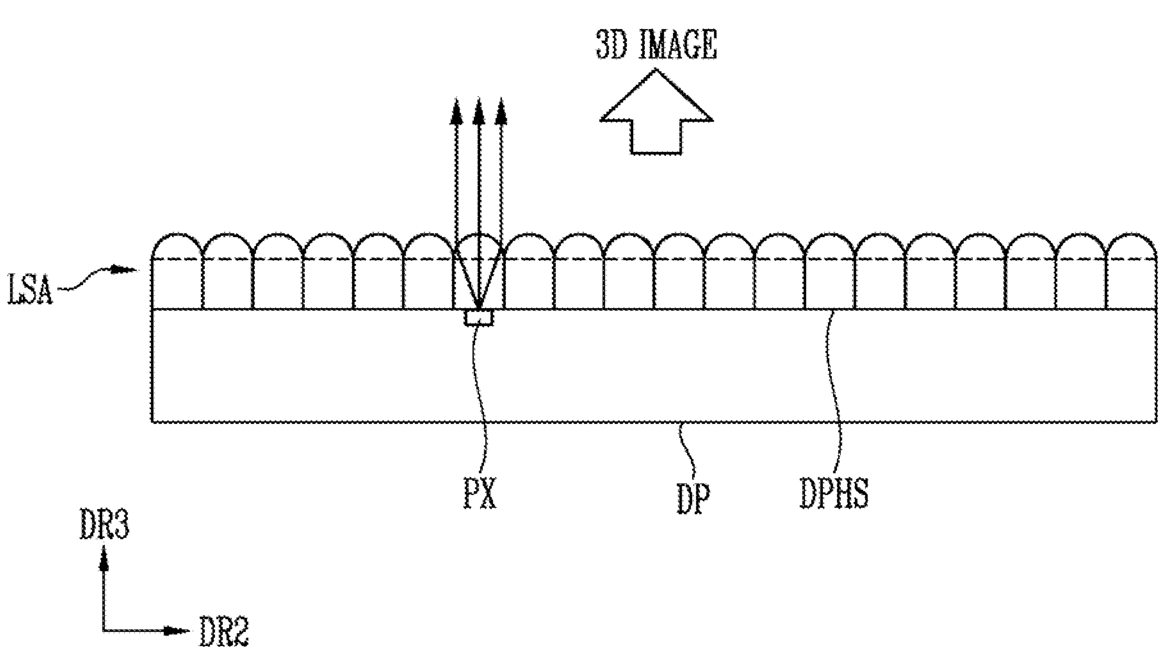
FIGS. 5 and 6 illustrate a 3D display mode and a 2D display mode, respectively.
Figure 6:
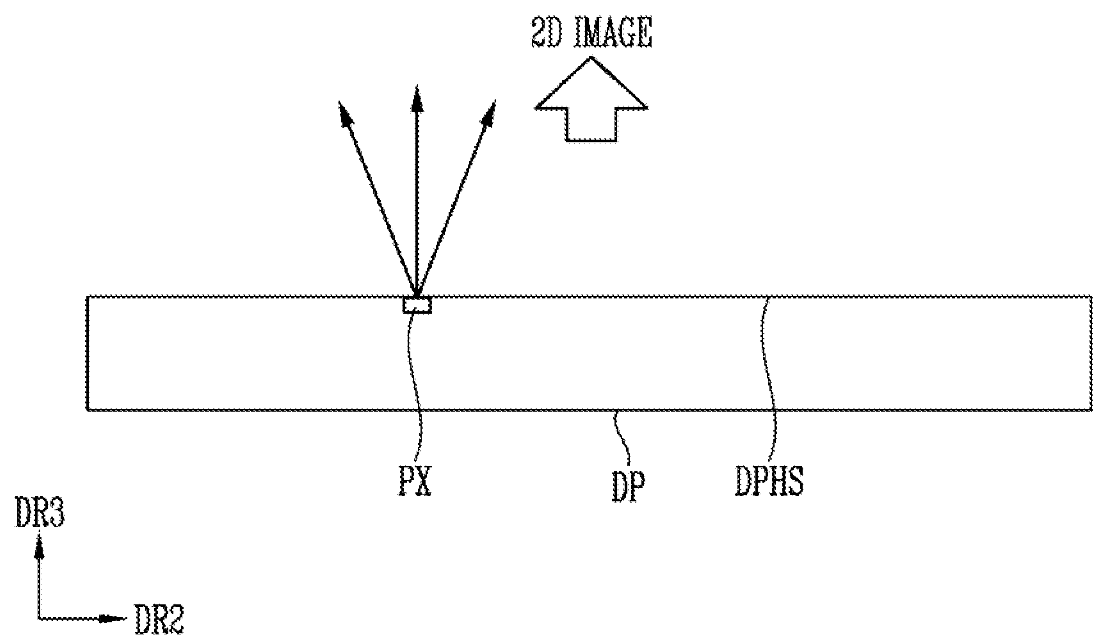

FIGS. 5 and 6 illustrate a 3D display mode and a 2D display mode.

In an embodiment, FIG. 5 shows the display device DD being driven in a 3D display mode for displaying a 3D image 3D IMAGE. In 3D display mode, the lens array LSA covers the pixels PX on the front surface DPHS of the display panel DP. For example, the lens bodies LSP1 to LSPn of the lens array LSA form the 3D image 3D IMAGE by refracting the light emitted from the pixels PX in a desired direction.

In an embodiment, FIG. 6 shows the display device DD being driven in a 2D display mode for displaying a 2D image 2D IMAGE. In 2D display mode, the lens array LSA does not cover the pixels PX on the front surface DPHS of the display panel DP. In this case, light emitted from the pixels PX has a wide viewing angle and forms the 2D image 2D IMAGE.

Figure 7:
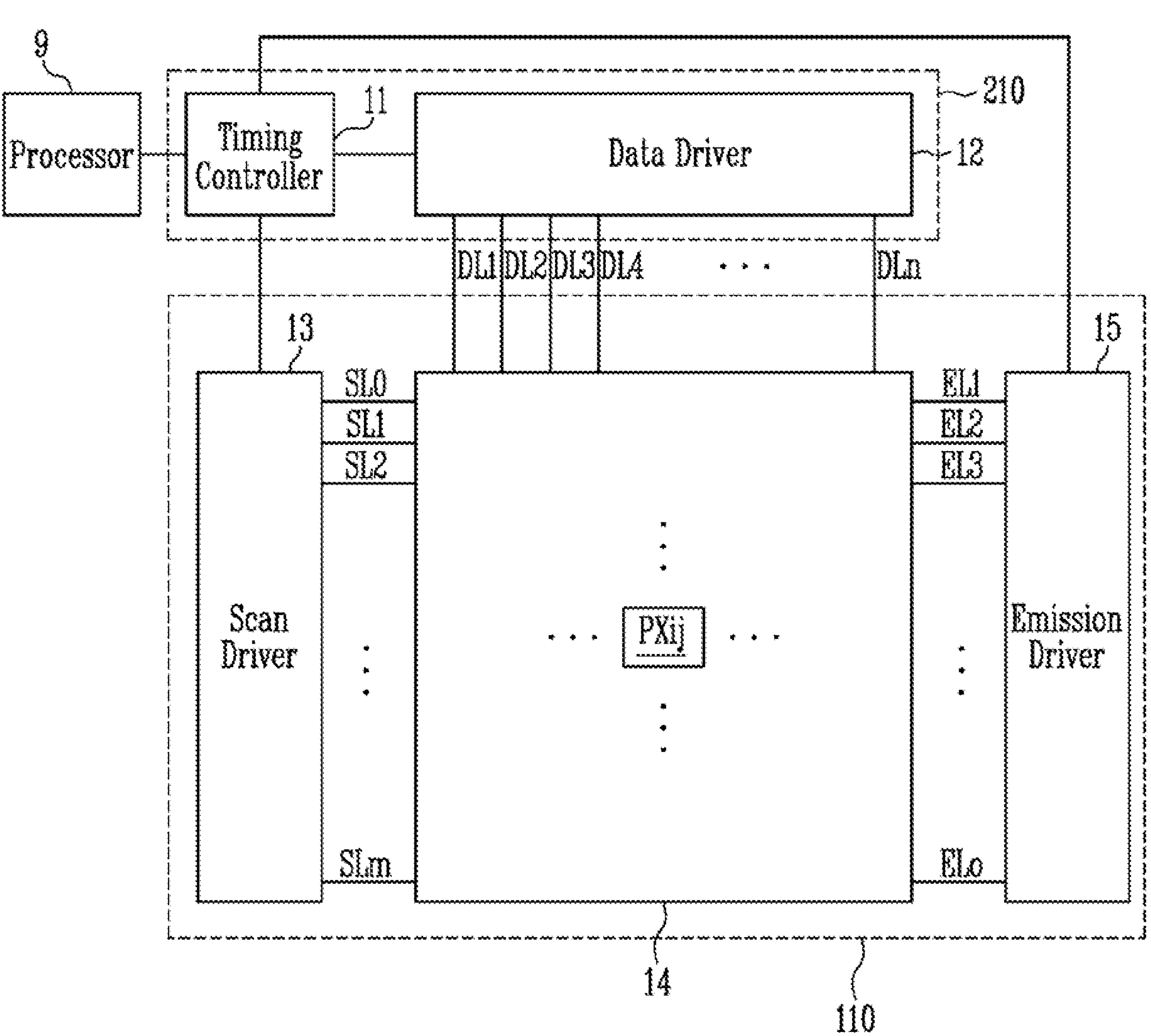
Figure 8:
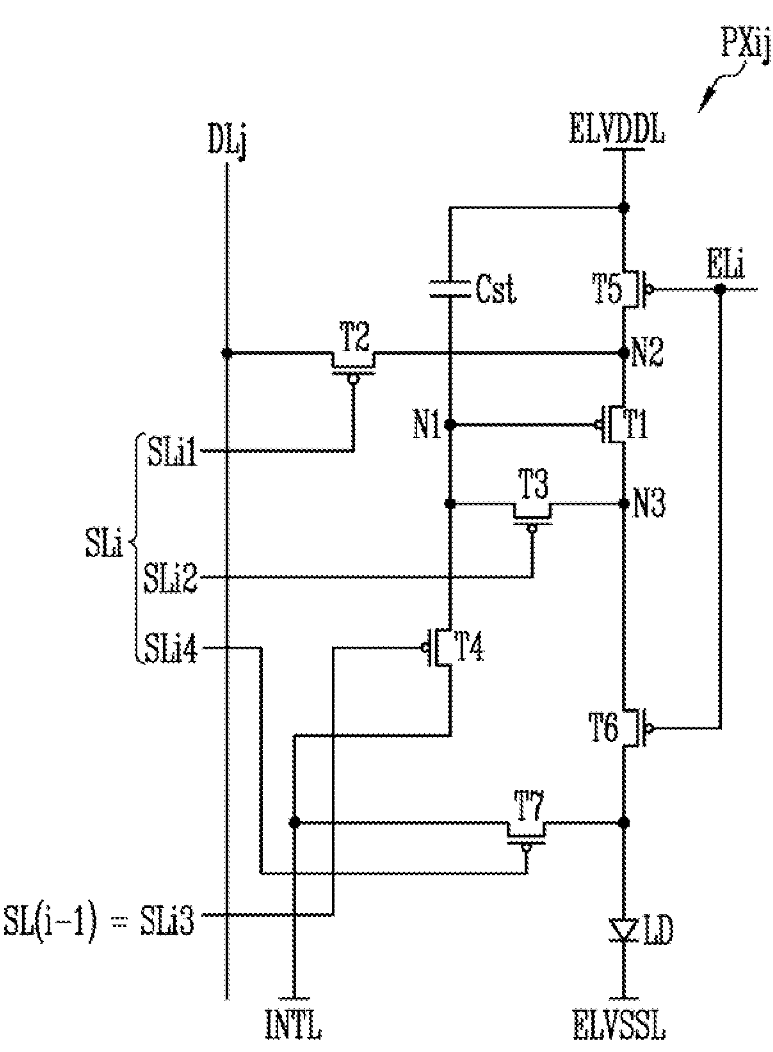
Figure 9:
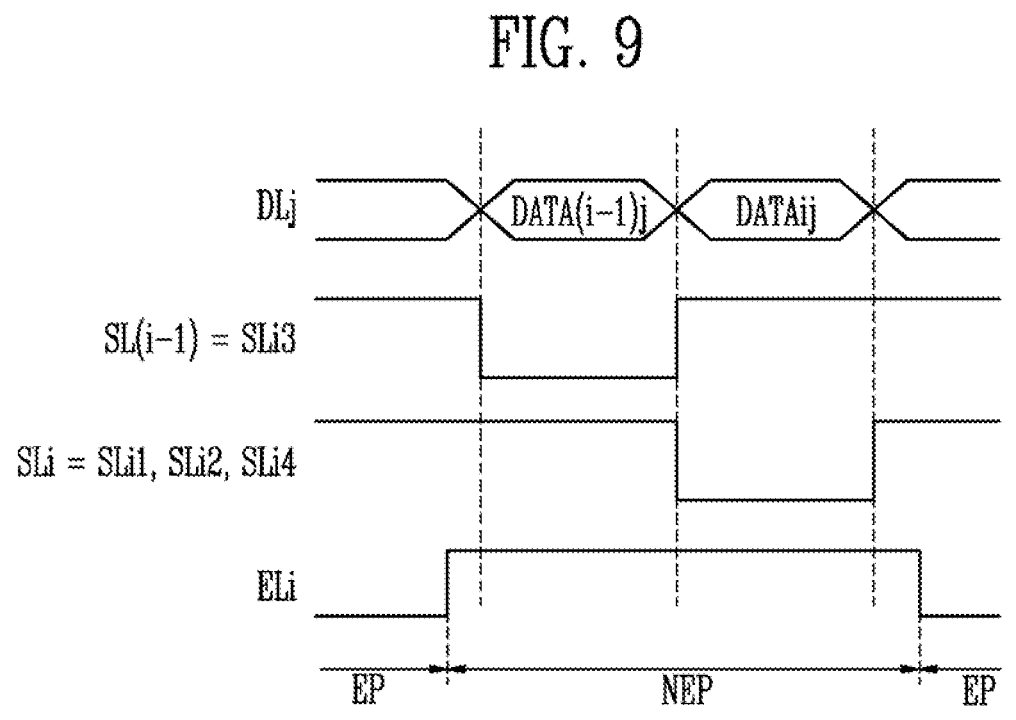

FIGS. 7 to 9 illustrate electrical configurations of a display device according to an embodiment.

FIG. 7 illustrates a display unit 110 and a display driver 210 according to an embodiment of the present disclosure.

Referring to FIG. 7, in an embodiment, the display driver 210 includes a timing controller 11 and a data driver 12. The display unit 110 includes a scan driver 13, a pixel unit 14, and an emission driver 15. However, whether each functional unit is integrated into one IC, integrated into a plurality of ICs, or mounted on a display substrate may vary according to specifications of a display device.

The timing controller 11 receives grayscales and timing signals for each display frame period from a processor 9. For example, the processor may be at least one of a graphics processing unit (GPU), a central processing unit (CPU), or an application processor (AP). The timing signals include a vertical synchronization signal, a horizontal synchronization signal, a data enable signal, etc.

Each cycle of the vertical synchronization signal corresponds to each display frame period. Each cycle of the horizontal synchronization signal corresponds to each horizontal line period. The grayscales are supplied in units of horizontal lines in each horizontal line period in response to a pulse of an enable level of a data enable signal. A horizontal line refers to pixels, such as a pixel row, that are connected to the same scan line and emission line.

The timing controller 11 renders the grayscales to correspond to the specifications of the display device. For example, the processor 9 provides a red grayscale, a green grayscale, and a blue grayscale for each unit dot. For example, when the pixel unit 14 has an RGB stripe structure, a pixel corresponds to each of the grayscales on a one-to-one basis. For example, the grayscales need not be rendered. However, for example, when the pixel unit 14 has a pentile (PENTILE™) structure, since adjacent unit dots share a pixel, the pixel does not correspond to each of the grayscales on a one-to-one basis. For example, the grayscales are rendered. The rendered or non-rendered grayscales are provided to the data driver 12. In addition, the timing controller 11 provides a data control signal to the data driver 12, provides a scan control signal to the scan driver 13 and provides an emission control signal to the emission driver 15.

The data driver 12 generates data voltages to be provided to data lines DL1, DL2, DL3, DL4, . . . , and DLn using the grayscales and the data control signal received from the timing controller 11, where n is an integer greater than 0.

The scan driver 13 generates scan signals to be provided to scan lines SL0, SL1, SL2, . . . , and SLm using the scan control signal, such as a clock signal or a scan start signal, etc., received from the timing controller 11, where m is an integer greater than 0. The scan driver 13 sequentially supplies scan signals that have a turn-on level pulse to the scan lines SL0 to SLm. The scan driver 13 includes scan stages configured in the form of a shift register. The scan driver 13 generates the scan signals by sequentially transmitting the scan start signal in the form of a turn-on level pulse to the next scan stage according to the control of the clock signal.

The emission driver 15 generates emission signals to be provided to emission lines EL1, EL2, EL3, . . . , and ELo using the emission control signal, such as a clock signal or an emission stop signal, etc., received from the timing control unit 11, where o is an integer greater than 0. The emission driver 15 sequentially supplies emission signals that have a turn-off level pulse to the emission lines EL1 to ELo. The emission driver 15 includes emission stages configured in the form of a shift register. The emission driver 15 generates the emission signals by sequentially transmitting the emission stop signal in the form of a turn-off level pulse to the next emission stage according to the control of the clock signal.

The pixel unit 14 includes pixels. Each pixel PXij is connected to a corresponding data line, a corresponding scan line, and a corresponding emission line. The pixels include pixels that emit light of a first color, pixels that emit light of a second color, and pixels that emit light of a third color. The first color, the second color, and the third color are different colors. For example, the first color may be one of red, green, or blue. The second color may be one of red, green, or blue other than the first color. The third color may be one of red, green, or blu other than the first color and the second color. In addition, magenta, cyan, and yellow may be used as the first to third colors instead of red, green, and blue.

FIG. 8 illustrates a pixel according to an embodiment of the present disclosure.

Referring to FIG. 8, in an embodiment, a pixel PXij includes transistors T1, T2, T3, T4, T5, T6, and T7, a storage capacitor Cst, and a light emitting element LD.

Hereinafter, a circuit composed of P-type transistors will be described as an example. However, a person skilled in the art will be able to design a circuit composed of N-type transistors by changing the polarity of a voltage applied to a gate terminal. Similarly, a person skilled in the art will be able to design a circuit composed of a combination of P-type transistors and N-type transistors. A P-type transistor is a transistor in which the amount of current increases when a voltage difference between a gate electrode and a source electrode increases in a negative direction. An N-type transistor is a transistor in which the amount of current increases when a voltage difference between a gate electrode and a source electrode increases in a positive direction. The transistors may have various forms, such as a thin film transistor (TFT), a field effect transistor (FET), or a bipolar junction transistor (BJT).

A first transistor T1 has a gate electrode connected to a first node N1, a first electrode connected to a second node N2, and a second electrode connected to a third node N3. The first transistor T1 is a driving transistor.

A second transistor T2 has a gate electrode connected to a scan line SLi1, a first electrode connected to a data line DLj, and a second electrode connected to the second node N2. The second transistor T2 is a scan transistor.

A third transistor T3 has a gate electrode connected to a scan line SLi2, a first electrode connected to the first node N1, and a second electrode connected to the third node N3. The third transistor T3 is a diode-connected transistor.

A fourth transistor T4 has a gate electrode connected to a scan line SLi3, a first electrode connected to the first node N1, and a second electrode connected to an initialization line INTL. The fourth transistor T4 is a gate initialization transistor.

A fifth transistor T5 has a gate electrode connected to an i-th emission line ELi, a first electrode connected to a first power source line ELVDDL, and a second electrode connected to the second node N2. The fifth transistor T5 is an emitting transistor. In an embodiment, the gate electrode of the fifth transistor T5 is connected to an emission line that differs from an emission line connected to a gate electrode of a sixth transistor T6.

The sixth transistor T6 has the gate electrode connected to the i-th emission line ELi, a first electrode connected to the third node N3, and a second electrode connected to an anode of the light emitting element LD. The sixth transistor T6 is an emission transistor. In an embodiment, the gate electrode of the sixth transistor T6 is connected to an emission line that differs from the emission line connected to the gate electrode of the fifth transistor T5.

A seventh transistor T7 has a gate electrode connected to a scan line SLi4, a first electrode connected to the initialization line INTL, and a second electrode connected to the anode of the light emitting element LD. The seventh transistor T7 is a light emitting element initialization transistor.

A first electrode of the storage capacitor Cst is connected to the first power source line ELVDDL, and a second electrode of the storage capacitor Cst is connected to the first node N1.

The light emitting element LD has the anode connected to the second electrode of the sixth transistor T6 and a cathode connected to a second power source line ELVSSL. The light emitting element LD is a light emitting diode. The light emitting element LD is one of an organic light emitting diode, an inorganic light emitting diode, or a quantum dot/well light emitting diode, etc. The light emitting element LD emits light of one of a first color, a second color, or a third color. In addition, although an embodiment describes a case in which only one light emitting element LD is provided in each pixel, a plurality of light emitting elements can be provided in each pixel in another embodiment. For example, the plurality of light emitting elements may be connected in series, in parallel, in series and parallel, etc.

A first power source voltage is applied to the first power source line ELVDDL, a second power source voltage is applied to the second power source line ELVSSL, and an initialization voltage is applied to the initialization line INTL. For example, the first power source voltage is greater than the second power source voltage. For example, the initialization voltage is equal to or greater than the second power source voltage. For example, the initialization voltage corresponds to a least magnitude data voltage of the data voltages that can be provided. In another example, the magnitude of the initialization voltage is less than magnitudes of the data voltages that can be provided.

FIG. 9 illustrates a method of driving a pixel of FIG. 8.

Hereinafter, for convenience of description, it is assumed that the scan lines SLi1, SLi2, and SLi4 are an i-th scan line SLi, and the scan line SLi3 is an (i−1)th scan line SL(i−1). However, the connection relationship of the scan lines SLi1, SLi2, SLi3, and SLi4 may vary according to embodiments. For example, the scan line SLi4 may be the (i−1)th scan line or an (i+1)th scan line.

In an embodiment, a turn-off level (logic high level) emission signal is applied to the i-th emission line ELi, and a data voltage DATA(i−1)j for an (i−1)th pixel is applied to the data line DLj, and a turn-on level (logic low level) scan signal of is applied to the scan line SLi3. High/low at the logic level varies depending on whether the transistor is P-type or N-type.

For example, since a turn-off level scan signal is applied to the scan lines SLi1 and SLi2, the second transistor T2 is in a turned-off state, and the data voltage DATA(i−1)j for the (i−1)th pixel is prevented from being applied to the pixel PXij.

For example, since the fourth transistor T4 is in a turned-on state, the first node N1 is connected to the initialization line INTL to initialize the voltage of the first node N1. Since the turn-off level emission signal is applied to the emission line ELi, the transistors T5 and T6 are in a turned-off state, so that light is not unnecessarily emitted from the light emitting element LD in a process of applying the initialization voltage.

In an embodiment, a data voltage DATAij for an i-th pixel PXij is applied to the data line DLj, and a turn-on level scan signal is applied to the scan lines SLi1 and SLi2. Accordingly, the transistors T2, T1, and T3 are turned-on, and the data line DLj and the first node N1 are electrically connected to each other. Accordingly, a compensation voltage obtained by subtracting a threshold voltage of the first transistor T1 from the data voltage DATAij is applied to the second electrode of the storage capacitor Cst, e.g., the first node N1, and the storage capacitor Cst maintains a voltage that corresponds to a difference between the first power source voltage and the compensation voltage. This period is a threshold voltage compensation period or a data writing period.

In addition, when the scan line SLi4 is the i-th scan line, since the seventh transistor T7 is turned-on, the anode of the light emitting element LD and the initialization line INTL are connected to each other, and the light emitting element LD is initialized with an amount of charge that corresponds to a voltage difference between the initialization voltage and the second power source voltage.

In an embodiment, as a turn-on level emission signal is applied to the i-th emission line ELi, the transistors T5 and T6 are turned on. Accordingly, a driving current path that connects the first power source line ELVDDL, the fifth transistor T5, the first transistor T1, the sixth transistor T6, the light emitting element LD, and the second power source line ELVSSL is formed.

The amount of driving current that flows through the first electrode and the second electrode of the first transistor T1 is adjusted according to the voltage maintained in the storage capacitor Cst. The light emitting element LD emits light with a luminance that corresponds to the amount of driving current. The light emitting element LD emits light until a turn-off level emission signal is applied to the emission line ELi.

When the emission signal is at a turn-on level, pixels that receive the emission signal are in a display state. Accordingly, a period in which the emission signal is at the turn-on level is an emission period EP, or an emission allowable period. In addition, when the emission signal is at a turn-off level, pixels that receive the emission signal are in a non-display state. Accordingly, a period in which the emission signal is at the turn-off level is a non-emission period NEP, or emission disallowing period.

The non-emission period NEP described with reference to FIG. 9 is a period for preventing the pixel PXij from emitting light with an undesired luminance during an initialization period and the data writing period.

One or more non-emission periods NEP may be additionally provided while data written in the pixel PXij is maintained, such as one frame period. This can effectively express a low grayscale by reducing the emission period EP of the pixel PXij, or to smoothly blur the motion of an image.

A display device and a method for controlling the same according to embodiments of the present disclosure can switch between a 3D display mode and a 2D display mode.

The drawings referred to heretofore and the detailed description of embodiments of the disclosure described above are illustrative of the disclosure. It is to be understood that embodiments of the disclosure have been disclosed for illustrative purposes only and are not intended to limit the meaning or scope of embodiments of the disclosure as set forth in the claims. Therefore, those skilled in the art will appreciate that various modifications and equivalent embodiments are possible without departing from the scope of embodiments of the disclosure. Accordingly, the true technical protection scope of embodiments of the disclosure should be determined by the technical idea of the appended claims.

What is claimed is:

1. A display device, comprising:

a display panel that includes pixels that emit light to a front surface of the display panel;

a lens array that extends in a first direction and includes lens elements arranged in a second direction perpendicular to the first direction and a connecting body that flexibly and elastically connects the lens elements to each other; and a roller that moves the lens array in the second direction, wherein each of the lens elements includes:

a support body that extends in the first direction; and a lens body that includes a lower portion in contact with the support body and a convex upper portion, wherein support bodies of the lens elements are separated from each other, wherein the connecting body is formed between lens bodies and support bodies of adjacent lens elements, wherein a portion of the connecting body that connects the support bodies of the lens elements that cover the roller is longer than a portion of the connecting body that connects the support bodies of the lens elements that cover the pixels, and wherein an upper surface of the connecting body between tops of the lens bodies of the adjacent lens elements is flat.

2. The display device of claim 1, wherein the lens elements are made of a rigid material.

3. The display device of claim 2, wherein the support body and the lens body are made of a transparent metal, and wherein the connecting body is made of resin.

4. The display device of claim 3, wherein the support body and the lens body are made of aluminum oxynitride $((AlN)_x \cdot (Al_2O_3)_{1-x})$.

5. The display device of claim 1, further comprising:

a cabinet that accommodates the roller and the lens array.

6. The display device of claim 5, wherein in a 3-dimensional (3D) display mode, the lens array covers the pixels on the front surface of the display panel, and wherein in a 2-dimensional (2D) display mode, the lens array is wound around the roller inside the cabinet and does not cover the pixels on the front surface of the display panel.

7. The display device of claim 1, wherein in a 3-dimensional (3D) display mode, the lens array covers the pixels on the front surface of the display panel, and wherein in a 2D display mode, the lens array is positioned on a rear surface of the display panel and does not cover the pixels on the front surface of the display panel.

8. A method for controlling a display device that includes a lens array that extends in a first direction and includes lens elements arranged in a second direction perpendicular to the first direction and a connecting body that flexibly and elastically connects the lens elements to each other, and a roller, the method comprising:

moving the lens array in the second direction by the roller wherein the lens array covers pixels on a front surface of a display panel in a 3D display mode; and moving the lens array opposite to the second direction by the roller wherein the lens array does not cover the pixels on the front surface of the display panel in a 2D display mode, wherein each of the lens elements includes:

a support body that extends in the first direction; and a lens body that includes a lower portion in contact with the support body and a convex upper portion, wherein support bodies of the lens elements are separated from each other, wherein the connecting body is formed between lens bodies and support bodies of adjacent lens elements, wherein a portion of the connecting body that connects the support bodies of the lens elements that cover the roller is longer than a portion of the connecting body that connects the support bodies of the lens elements that cover the pixels, and wherein an upper surface of the connecting body between tops of the lens bodies of the adjacent lens elements is flat.

9. The method of claim 8, wherein the lens elements are made of a rigid material.

10. The method of claim 9, wherein the support body and the lens body are made of a transparent metal, and wherein the connecting body is made of resin.

11. The method of claim 10, wherein the support body and the lens body are made of aluminum oxynitride $((AlN)_x \cdot (Al_2O_3)_{1-x})$.

12. The method of claim 8, wherein the display device further includes a cabinet that accommodates the roller and the lens array.

13. The method of claim 12, wherein the lens array is positioned inside the cabinet in the 2D display mode.

14. The method of claim 8, wherein the lens array is positioned on a rear surface of the display panel in the 2D display mode.

* * * * *